US00RE46519E

(19) United States
(12) Reissued Patent
Kim

(10) Patent Number: US RE46,519 E
(45) Date of Reissued Patent: *Aug. 22, 2017

(54) DEVELOPING DEVICE, MEMORY UNIT THEREOF, AND IMAGE FORMING APPARATUS

(71) Applicant: Samsung Electronics Co., Ltd., Suwon-si (KR)

(72) Inventor: Young Min Kim, Suwon-si (KR)

(73) Assignee: S-PRINTING SOLUTION CO., LTD., Suwon-si (KR)

( * ) Notice: This patent is subject to a terminal disclaimer.

(21) Appl. No.: 14/657,486

(22) Filed: Mar. 13, 2015

Related U.S. Patent Documents

Reissue of:
(64) Patent No.: 7,742,717
Issued: Jun. 22, 2010
Appl. No.: 12/173,254
Filed: Jul. 15, 2008

(30) Foreign Application Priority Data

Sep. 11, 2007 (KR) ..... 10-2007-0091999
Feb. 29, 2008 (KR) ..... 10-2008-0018969

(51) Int. Cl.
*G03G 15/00* (2006.01)
*G03G 15/08* (2006.01)

(52) U.S. Cl.
CPC ..... *G03G 15/0896* (2013.01); *G03G 15/0863* (2013.01); *G03G 15/553* (2013.01); *G03G 15/556* (2013.01); *G03G 2215/0174* (2013.01); *G03G 2215/0697* (2013.01); *G03G 2221/166* (2013.01); *G03G 2221/1657* (2013.01); *G03G 2221/1846* (2013.01)

(58) Field of Classification Search
CPC ..... G03G 21/1885
USPC ..... 399/90
See application file for complete search history.

(56) References Cited

U.S. PATENT DOCUMENTS 5,761,589 A * 6/1998 Kido et al. ..... 399/284
5,907,748 A * 5/1999 Kawana ..... G03G 21/1885 399/111

(Continued)

FOREIGN PATENT DOCUMENTS

CN 1450416 10/2003
CN 1605957 4/2005

(Continued)

OTHER PUBLICATIONS

European Search Report dated Jul. 9, 2009 issued in EP Application No. 08161123.8.

(Continued)

*Primary Examiner* — Deandra Hughes
(74) *Attorney, Agent, or Firm* — Staas & Halsey LLP

(57) ABSTRACT

A developing device to prevent damage of a memory unit and poor connection between terminals of the memory unit and a main body of an image forming apparatus, by improving a mounting position of the memory unit. The developing device is removably mounted to a main body of the image forming apparatus. The memory unit includes terminals exposed through a rear side of the developing device. The memory unit is disposed closer to a power reception unit formed at one side of the developing device than to a driving force reception unit formed at an other side of the developing device.

34 Claims, 5 Drawing Sheets

(56) References Cited

U.S. PATENT DOCUMENTS

| | | | | |
|---|---|---|---|---|
| 5,926,666 | A * | 7/1999 | Miura et al. | G03G 21/1885 399/25 |
| 5,937,239 | A * | 8/1999 | Watanabe | G03G 21/1853 399/111 |
| 6,097,908 | A * | 8/2000 | Uchiyama | G03G 15/553 399/111 |
| 6,349,182 | B2 * | 2/2002 | Otsubo | G03G 21/1885 399/111 |
| 6,892,039 | B2 * | 5/2005 | Okamoto | B41J 2/17526 399/119 |
| 7,184,682 | B2 * | 2/2007 | Chadani | G03G 21/1825 399/111 |
| 7,194,220 | B2 * | 3/2007 | Sasaki | G03G 21/1853 399/111 |
| 8,032,060 | B2 | 10/2011 | Jeon | |
| 8,260,168 | B2 * | 9/2012 | Eom | G03G 15/0863 399/90 |
| 2003/0091361 | A1 | 5/2003 | Noda et al. | |
| 2003/0170042 | A1 * | 9/2003 | Okamoto et al. | 399/90 |
| 2005/0078978 | A1 * | 4/2005 | Suzuki et al. | 399/111 |
| 2005/0095020 | A1 | 5/2005 | Eom et al. | |
| 2005/0254832 | A1 * | 11/2005 | Kumai et al. | 399/12 |
| 2005/0254834 | A1 * | 11/2005 | Shibui | 399/12 |
| 2005/0254835 | A1 * | 11/2005 | Takei | 399/12 |
| 2006/0024080 | A1 | 2/2006 | Chadani | |
| 2007/0189781 | A1 | 8/2007 | Katogi et al. | |
| 2008/0226338 | A1 * | 9/2008 | Ahn | G03G 21/1853 399/111 |

FOREIGN PATENT DOCUMENTS

| | | |
|---|---|---|
| EP | 1621942 | 2/2006 |
| JP | 2002202698 | 7/2002 |
| JP | 2003195723 | 7/2003 |
| JP | 2003-255698 | 9/2003 |
| JP | 2005-338392 | 12/2005 |
| KR | 2007-42857 | 4/2007 |

OTHER PUBLICATIONS

U.S. Notice of Allowance dated Apr. 28, 2010 in U.S. Appl. No. 12/173,254.

U.S. Notice of Allowance dated Feb. 12, 2010 in U.S. Appl. No. 12/173,254.

U.S. Office Action dated Nov. 24, 2009 in U.S. Appl. No. 12/173,254.

U.S. Office Action dated Apr. 27, 2009 in U.S. Appl. No. 12/173,254.

European Communication and B11 Appeal Judgment dated Jul. 1, 2015 in European Patent Application No. 11180248.4.

European Interlocutory Decision in Opposition Proceedings dated Nov. 26, 2014 in European Patent Application No. 08161123.8.

European Communication of the Board of Appeal dated Sep. 23, 2015 in European Patent Application No. 08161123.8.

Extended European Search Report dated Jul. 19, 2016 from European Patent Application No. 14166674.3, 7 pages.

Summons to Attend Oral Proceedings dated Jul. 22, 2016 from European Patent Application No. 11180248.4, 24 pages.

Summons to Attend Oral Proceedings dated Jul. 8, 2016 from European Patent Application No. 08161123.8, 15 pages.

European Office Action dated May 22, 2017 in European Patent Application No. 14166674.3.

Korean Office Action dated Jun. 17, 2008 issued in KR 2008-18969.

European Search Report dated Jul. 9, 2009 isued in EP Application No. 08161123.8.

European Search Report dated May 11, 2009 issued in EP 08161123.8.

Decision to Grant issued Dec. 24, 2009 in RU Application No. 2008130350/28.

Chinese Office Action issued Jan. 29, 2010 in CN Application No. 200810144708.9.

* cited by examiner

DEVELOPING DEVICE, MEMORY UNIT THEREOF, AND IMAGE FORMING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. Pat. No. 7,742,717, issued on Jun. 22, 2010, which* claims priority under 35 U.S.C. §119(a) from Korean Patent Application No. 2008-0018969 filed on Feb. 29, 2008 and No. 2007-0091999 filed on Sep. 11, 2007, in the Korean Intellectual Property Office, the disclosures of which are incorporated herein in their entirety by reference.

BACKGROUND OF THE INVENTION

1. Field of the Invention

The present general inventive concept relates to an image forming apparatus, and more particularly to a developing device with a memory unit, and an image forming apparatus having the same.

2. Description of the Related Art

Generally, an image forming apparatus produces an image on a printing medium in accordance with an input image signal. For example, a printer, a photocopier, a facsimile, and a multifunction peripheral (MFP) having combined functions of the aforementioned apparatuses belong to the image forming apparatus.

Especially, an electrophotographic image forming apparatus forms a desired image in the following process. First, a surface of a photoconductive medium is electrified to a predetermined electric potential. A laser beam is projected onto the surface of the photoconductive medium to form an electrostatic latent image. A visible image is obtained by supplying developer to the electrostatic latent image. Next, the visible developer image developed on the photoconductive medium is transferred to a printing medium directly or through an intermediate transferring medium, and then fixed to the printing medium passing through a fusing process.

During the above processes, a developing device of the image forming apparatus forms the visible image on the surface of the photoconductive medium by supplying the developer to the photoconductive device. In general, the developing device is structured as an integrated cartridge including a developer storage unit, an electrifying unit, a developing unit and a cleaning unit, and is detachably mounted to a main body of the image forming apparatus.

Since a life span of the developing device is limited, the developing device has to be replaced when exhausted. In order to favorably operate the image forming apparatus, timely replacement of the developing device is required. For this, a user has to be aware of various information on the developing device as follows.

The developing device is equipped with a memory unit for storing a variety of information on the operation thereof. The information stored in the memory unit may include a residual quantity of developer and a remaining life span of component parts.

The memory unit includes terminals at one side thereof while the main body of the image forming apparatus includes terminals corresponding to the terminals of the memory unit. Upon mounting of the developing device to the image forming apparatus, the memory unit terminals are electrically connected with the image forming apparatus terminals. In a state where the developing device is thus electrically connected to the main body of the image forming apparatus, the image forming apparatus recognizes the information stored in the memory unit, and displays the information for the user or performs any necessary operations using the information and transmits the operation result to the memory unit, thereby updating the information in the memory unit.

In order for favorable data communication between the developing device and the main body of the image forming apparatus, the memory unit should not be damaged and needs to be mounted at an appropriate position for a stable electric connection with the main body.

For example, if the memory unit is disposed around a fixing device which generates a lot of heat, the memory unit would be damaged by the heat. If the fixing device is disposed around the photoconductive medium or developing rollers, the terminals of the memory unit would be easily contaminated by developers scattering about from the photoconductive medium or the developing rollers. This will deteriorate the connection between the memory unit and the image forming apparatus. Furthermore, if the memory unit is disposed at a position such as an upper or lower surface of the developing device often interfered with by other component parts in the image forming apparatus when the developing device is mounted, the memory unit terminals are apt to be damaged during mounting of the developing device.

Moreover, when the memory unit is disposed at a position subject to vibration generated from the developing device in operation, the electric connection between the memory unit and the image forming apparatus becomes unstable due to the vibration transmitted to the memory unit.

SUMMARY OF THE INVENTION

The present general inventive concept provides a developing device to prevent damage of a memory unit and poor connection between terminals of the memory unit and a main body of an image forming apparatus, by improving a mounting position of the memory unit, and an image forming apparatus having the same.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a developing device usable with an image forming apparatus, the developing device including a memory unit disposed at a rear end of the developing device with respect to a direction of mounting the developing device to the image forming apparatus, wherein the developing device is removably mounted to the image forming apparatus.

The memory unit may include a plurality of terminals which are externally exposed through a rear side of the developing device.

The memory unit may be biased to one side from a middle of a width of the developing device.

The developing device may further include a driving force reception unit disposed at one side of the developing device to receive a driving force from the image forming apparatus, and a power reception unit disposed at an other side to receive an electric power from the image forming apparatus. Here, the memory unit may be disposed closer to the power reception unit than to the driving force reception unit.

The driving force reception unit may be disposed at one side of a front end of the developing device, and the power reception unit may be disposed at the other side of the front end.

The plurality of terminals may include a first terminal for data communication disposed farthest from the driving force reception unit among the plurality of terminals.

The plurality of terminals may include a second terminal to provide grounding disposed closest to the driving force reception unit among the plurality of terminals.

According to an exemplary embodiment, the second terminal has a larger area than other terminals.

The foregoing and/or other aspects and utilities of the general inventive concept may also be achieved by providing a developing device removably mounted to an image forming apparatus, the developing device including a housing, a driving force reception unit to receive a driving force from the image forming apparatus, a power reception unit to receive an electric power from the image forming apparatus, and a memory unit including terminals formed at a rear end of the housing with respect to a direction of mounting the developing device to the image forming apparatus, and disposed closer to the power reception unit than to the driving force reception unit.

The terminals may include a first terminal for data communication and a second terminal to provide grounding, the first terminal disposed relatively close to the power reception unit and the second terminal disposed relatively close to the driving force reception unit.

The foregoing and/or other aspects and utilities of the general inventive concept may also be achieved by providing a developing device removably mounted to an image forming apparatus, the developing device including a driving force reception unit to receive a driving force from the image forming apparatus, a power reception unit to receive an electric power from the image forming apparatus, and a memory unit to store information on usage of the developing device, wherein the memory unit includes a first terminal for data communication and a second terminal to provide grounding, the first terminal disposed relatively close to the power reception unit and the second terminal disposed relatively close to the driving force reception unit.

The memory unit may be disposed at a rear end of the developing device with respect to a direction of mounting the developing device to the image forming apparatus.

The foregoing and/or other aspects and utilities of the general inventive concept may also be achieved by providing a memory unit mounted to a developing device which operates by receiving a driving force and an electric power from an image forming apparatus, the memory unit including a plurality of terminals exposed through a rear side of the developing device and disposed closer to a second position of the developing device to receive the electric power from the image forming apparatus than to a first position of the developing device to receive the driving force from the image forming apparatus.

The foregoing and/or other aspects and utilities of the general inventive concept may also be achieved by providing a memory unit mounted to a developing device including a driving force reception unit to receive a driving force from an image forming apparatus and a power reception unit to receive an electric power from the image forming apparatus so as to store information on usage of the developing device, the memory unit including a first terminal for data communication and a second terminal to provide grounding, the first terminal disposed relatively close to the power reception unit and the second terminal disposed relatively close to the driving force reception unit.

The memory unit may be disposed at a rear end of the developing device with respect to a mounting direction of the developing device.

The foregoing and/or other aspects and utilities of the general inventive concept may also be achieved by providing an image forming apparatus including a main body including terminal contact points, and a developing device removably mounted to the main body, wherein the developing device includes a driving force reception unit to receive a driving force from the main body, a power reception unit to receive an electric power from the main body, and a memory unit including terminals electrically connected with the terminal contact points as formed at a rear end of the developing device with respect to a mounting direction of the developing device and disposed closer to the power reception unit than to the driving force reception unit.

The main body may include a main body cover disposed at a rear portion of the developing device with respect to the mounting direction of the developing device, and the terminal contact points are formed at the main body cover corresponding to the terminals.

The terminals may include a first terminal for data communication and a second terminal to provide grounding, and the first terminal is disposed closer to the power reception unit than the second terminal.

The second terminal among the terminals may be closest to the driving force reception unit.

The image forming apparatus may further include a circuit board mounted to the main body proximate to the power reception unit.

The foregoing and/or other aspects and utilities of the general inventive concept may also be achieved by providing an image forming apparatus including a main body, a main body cover pivotably mounted to the main body to open and close the main body, and a developing device including a memory unit and being able to be mounted and separated with respect to the main body with the main body cover opened, wherein the main body cover includes terminal contact points elastically connected with the memory unit and a pressing member elastically pressing the developing device.

The foregoing and/or other aspects and utilities of the general inventive concept may also be achieved by providing an image forming apparatus, including a main body having one of terminal contact points and corresponding terminals, and a developing device removably mounted to the main body to form an electrical connection therebetween, the developing device including a memory unit having an other one of the terminal contact points and corresponding terminals, wherein the electrical connection includes the terminal contact points elastically engaging the corresponding terminals when the developing device is mounted to the main body.

The memory unit may include the corresponding terminals.

The main body may include the terminal contact points.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
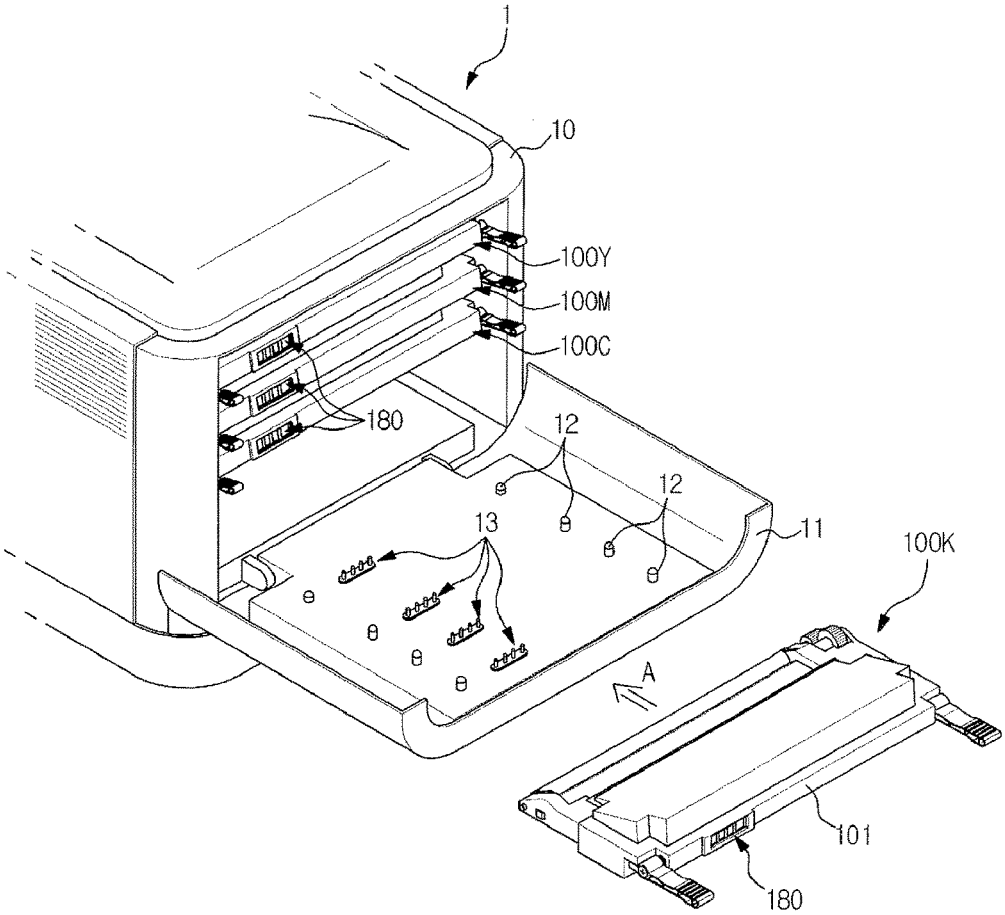
FIG. 1 is a perspective view illustrating an image forming apparatus according to an embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 2:
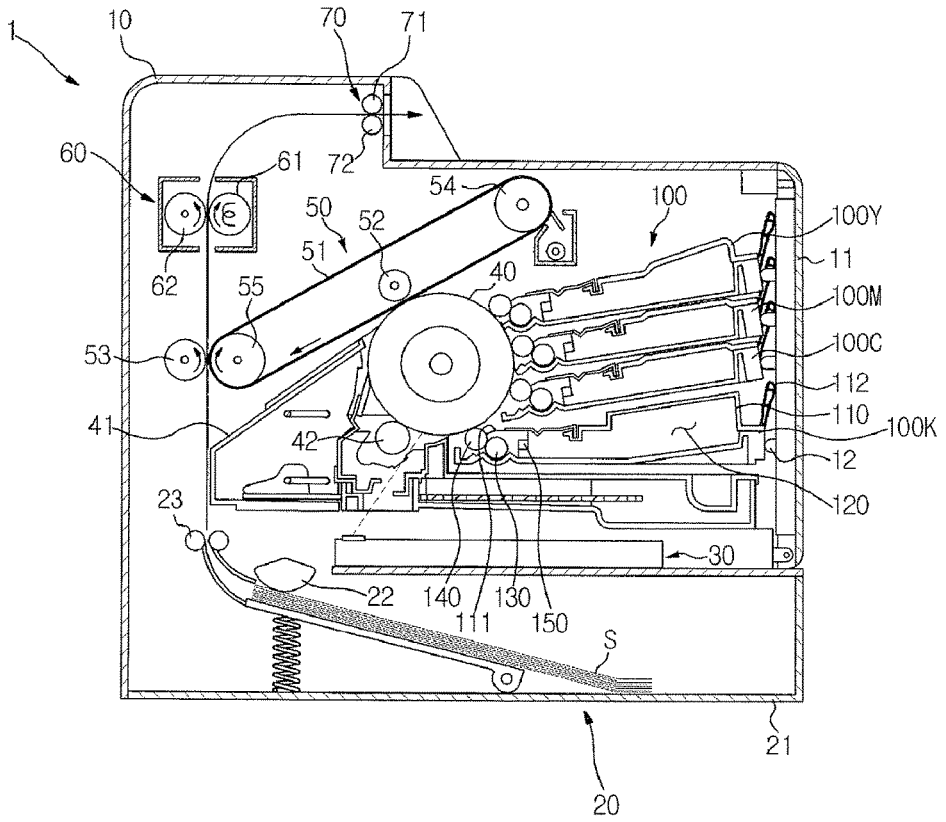
FIG. 2 is a view illustrating a structure of the image forming apparatus illustrated in FIG. 1.

FIG. 1 is a perspective view illustrating an image forming apparatus according to an embodiment of the present general inventive concept, and FIG. 2 is a view illustrating a structure of the image forming apparatus illustrated in FIG. 1. Referring to the FIG. 1 and FIG. 2, the image forming apparatus 1 includes a main body 10, a printing medium feeding device 20, a laser scanning device 30, a photoconductive medium 40, a developing device 100, a transferring device 50, a fixing device 60, and a printing medium discharging device 70.

Especially, the present embodiment will be explained regarding a color image forming apparatus. Therefore, the developing device 100 may include four developing devices 100K, 100C, 100M and 100Y to receive different colors of developers, that is, black (K), cyan (C), magenta (M) and yellow (Y) developers, respectively.

The main body 10 constitutes an exterior appearance of the image forming apparatus 1 and supports various parts mounted therein. A main body cover 11 is pivotably mounted to one side of the main body 10 to open and close a portion of the main body 10. Through the main body cover 11, a user can obtain access to the inside of the main body 10 for replacement or maintenance of the various parts including the developing devices 100K, 100C, 100M and 100Y.

The main body cover 11 is disposed at a rear portion of the developing devices 100K, 100C, 100M and 100Y with respect to an arrowed direction A to mount the developing devices 100K, 100C, 100M and 100Y to the main body 10. On an inner surface of the main body cover 11, pressing members 12 are formed to prevent movement of the developing devices 100K, 100C, 100M and 100Y by pressing the developing devices 100K, 100C, 100M and 100Y. More particularly, being protruded from the inner surface of the main body cover 11, the pressing member 12 press both sides of a rear end 101 of each developing device when the main body cover 11 is in a closed state. Here, the pressing members 12 may have predetermined elasticity to press the respective developing devices 100K, 100C, 100M and 100Y.

The printing medium feeding device 20 includes a cassette 21 to store printing medium S, a pickup roller 22 to pick up the printing medium S from the cassette 21 sheet by sheet, and a feeding roller 23 to carry the picked printing medium toward the transferring device 50.

The laser scanning device 30 projects a light to the photoconductive medium 40 in accordance with image information, thereby forming an electrostatic latent image on a surface of the photoconductive medium 40.

The photoconductive medium 40 is rotatably mounted to a photoconductive medium housing 41 which is removably mounted to the main body 10. An electrifying roller 42 is mounted in the photoconductive medium housing 41. Before the light is projected from the laser scanning device 30, the electrifying roller 42 electrifies the photoconductive medium 40 to a predetermined electric potential.

The developing device 100 supplies the developer to the photoconductive medium 40 bearing the electrostatic latent image thereon, thereby developing the electrostatic latent image into a visible image. The four developing devices 100K, 100C, 100M and 100Y for the respective colors are closely arranged side by side along a rotational direction of the photoconductive medium 40.

Each of the developing devices 100K, 100C, 100M and 100Y includes a developing device housing 110, a developer storage 120, a supplying roller 130, a developing roller 140 and an agitating member 150. In FIG. 1, only one developing device 100K is given those reference numerals 110, 120, 130, 140 and 150 for convenience.

The developing device housing 110 constitutes the exterior appearance of the respective developing devices 100K, 100C, 100M and 100Y and supports various parts mounted therein. The developer storage 120 stores the developer that will be supplied to the photoconductive medium 40. The agitating member 150 is rotatably mounted to the developer storage 120 to mix the developer in the developer storage 120, thereby preventing solidification of the developer, and carry the developer toward the supplying roller 130.

The supplying roller 130 supplies the developer stored in the developer storage 120 to the developing roller 140. When a developing bias is applied to the developing roller 140, the developing roller 140 forms the visible image by attaching the developer to the surface of the photoconductive medium 40 bearing the electrostatic latent image thereon.

A restriction member 111 is mounted to one side of an upper surface of the developing device housing 110. The restriction member 111 controls thickness of the developer attached to a surface of the developing roller 140 by the supplying roller 130.

Additionally, handles 112 are pivotably mounted to both rear sides of the developing device housing 110. When mounting and separating the developing devices 100K, 100C, 100M and 100Y, the user is able to conveniently grip the developing devices 100K, 100C, 100M and 100Y using the handles 112.

Figure 3:
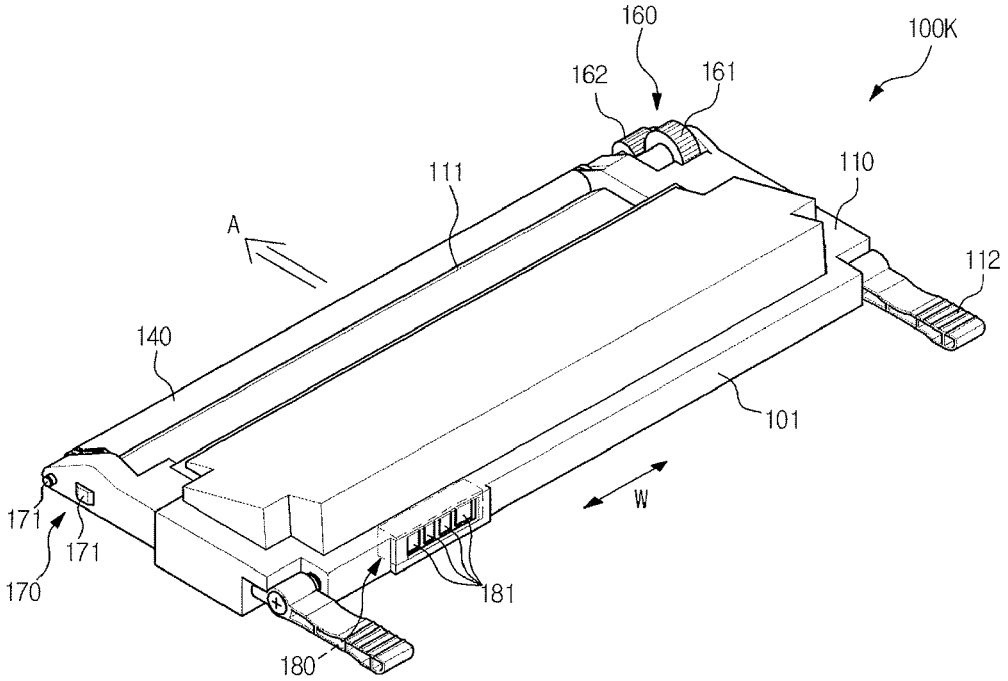
FIG. 3 is a perspective view illustrating a developing device according to an embodiment of the present general inventive concept.
Figure 4:
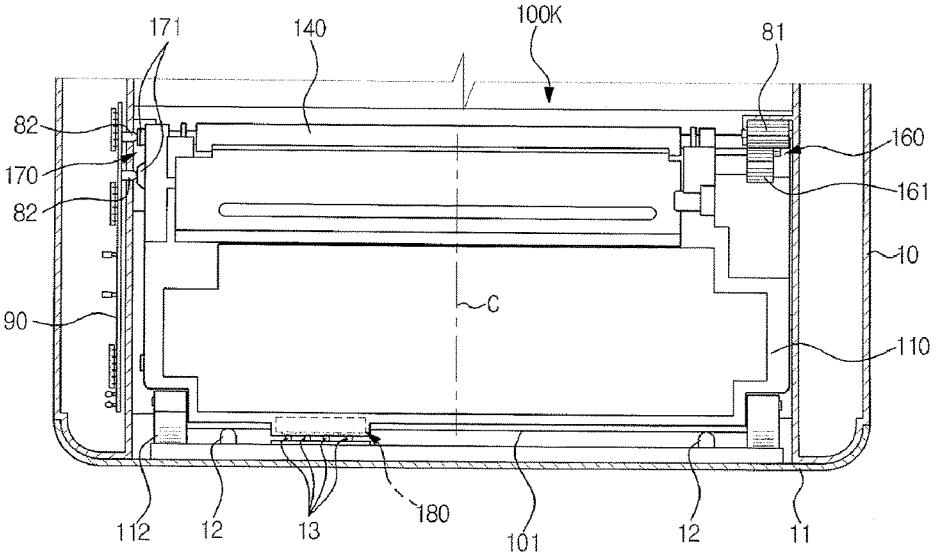
FIG. 4 is a plan view illustrating a portion of a main body of the image forming apparatus and the developing device.

FIG. 3 is a perspective view of the developing device according to an embodiment of the present general inventive concept. FIG. 4 is a plan view illustrating a portion of a main body of the image forming apparatus and the developing device. Although only the developing device 100K storing black developer will be described herein, the following description can actually be applied to the other developing devices 100C, 100M and 100Y in a same manner.

As illustrated in FIG. 3 and FIG. 4, the developing device 100K includes a driving force reception unit 160 to receive a driving force from the main body 10 of the image forming apparatus 1 (FIG. 2), and a power reception unit 170 transmitted with an electric power from the main body 10. The driving force reception unit 160 and the power reception unit 170 are disposed opposite to each other with respect to a width direction W of the developing device 100K.

More specifically, the driving force reception unit 160 is supplied with the driving force required for operations of the developing roller 140, the supplying roller 130 (FIG. 2) and the agitating member 150 (FIG. 2). The driving force reception unit 160 is disposed at one side of a front end of the developing device 100K with respect to the mounting direction A of the developing device 100K. The driving force reception unit 160 includes a connecting gear 161 rotatably mounted to the developing device housing 110, and a developing roller driving gear 162 meshed with the connecting gear 161.

In addition, the main body 10 of the image forming apparatus includes a power transmission gear 81 to transmit a driving power to the developing device 100K. Upon mounting of the developing device 100K to the main body 10, the connecting gear 161 of the developing device 100K is meshed with the power transmission gear 81 as illustrated in FIG. 4. The power transmission gear 81 is rotated by a driving motor (not illustrated) mounted in the main body 10. The connecting gear 161, rotating in mesh with the power transmission gear 81, transmits the driving power to the developing roller driving gear 162 to rotate the developing roller 140. Also, the connecting gear 161 transmits the driving power to the supplying roller 130 (FIG. 2) and the agitating member 150 (FIG. 2), thereby rotating the supplying roller 130 and the agitating member 150.

The power reception unit 170 is applied with the electric power required to electrify the developing roller 140, the supplying roller 130 or the restriction member 111. Therefore, the power reception unit 170 is disposed at an other side of the front end of the developing device 100K.

The power reception unit 170 includes first electric contact points 171 exposed to a lateral side of the developing device 100K. A circuit board 90 is provided at the main body 10 of the image forming apparatus 1, adjoining the power reception unit 170. Additionally, the main body 10 includes second electric contact points 82 arranged corresponding to the first electric contact points 171. The second electric contact points 82 are electrically connected with the circuit board 90.

When the developing device 100K is mounted to the main body 10, the first electric contact points 171 of the developing device 100K are connected to the second electric contact points 82 of the main body 10 as illustrated in FIG. 4. Accordingly, the electric power applied from the circuit board 90 can be transmitted to the developing device 100K through the second and the first electric contact points 82 and 171.

As illustrated in FIG. 2, the transferring device 50 includes an intermediate transfer belt 51, a first transfer roller 52 and a second transfer roller 53.

The intermediate transfer belt 51 runs at a same velocity as a linear velocity of the photoconductive medium 40, as being supported by supporting rollers 54 and 55. The first transfer roller 52 faces the photoconductive medium 40 with the intermediate transfer belt 51 disposed therebetween, and transfers the visible image formed on the photoconductive medium 40 to the intermediate transfer belt 51.

The second transfer roller 53 faces the supporting roller 55 with the intermediate transfer belt 51 disposed therebetween. While the visible image is being transferred from the photoconductive medium 40 to the intermediate transfer belt 51, the second transfer roller 53 is distanced away from the intermediate transfer belt 51. Alternatively, after the image of the photoconductive medium 40 is completely transferred to the intermediate transfer belt 51, the second transfer roller 53 is brought into contact with the intermediate transfer belt 51 by a predetermined pressure. When the contact between the second transfer roller 53 and the intermediate transfer belt 51 is achieved, the visible image is transferred from the intermediate transfer belt 51 to the printing medium.

The fixing device 60 includes a heating roller 61 including a heat source, and a pressing roller 62 mounted opposite to the heating roller 61. As the printing medium passes through between the heating roller 61 and the pressing roller 62, the image is fixed to the printing medium by heat transmitted from the heating roller 61 and pressure exerted between the heating roller 61 and the pressing roller 62.

The printing medium discharging device 70, including a discharging roller 71 and a backup roller 72, discharges the printing medium passed through the fixing device 60 to the outside of the main body 10.

Hereinafter, the operation of the above-structured image forming apparatus will be briefly described. Upon starting of the printing operation, the surface of the photoconductive medium 40 is electrified uniformly by the electrifying roller 42. On the electrified surface of the photoconductive medium 40, a light corresponding to image information on any one color, for example, information on a yellow image is projected by the laser scanning device 30. Accordingly, an electrostatic latent image corresponding to the yellow image is formed on the photoconductive medium 40.

Next, the developing bias is applied to the developing roller 140 of the yellow developing device 100Y. Accordingly, the yellow developer is attached to the electrostatic latent image, 20 thereby forming a visible image of yellow color on the photoconductive medium 40. The visible image is transferred to the intermediate transfer belt 51 through the first transfer roller 52.

After transferring of the yellow image for one page is completed, the laser scanning device 30 now projects a light corresponding to image information on another color, for example, information on a magenta image to the photoconductive medium 40, thereby forming an electrostatic latent image corresponding to the magenta image. The magenta developing device 100M forms a visible image of magenta color by supplying magenta developer to the electrostatic latent image. The magenta visible image formed on the photoconductive medium 40 is transferred to the intermediate transfer belt through the first transfer roller 52. At this time, the magenta visible image is superposed on the yellow visible image previously transferred.

By performing the same processes as the above with regard to cyan and black, a full-color image wherein the yellow, magenta, cyan and black images are overlapped is formed on the intermediate transfer belt 51. The full-color image is transferred to the printing medium while the printing medium is passing through between the intermediate transfer belt 51 and the second transfer belt 53. Then, the printing medium is passed through the fixing device 60 and the discharging device 70, thereby being discharged out of the main body 10.

During the above printing processes, the developers stored in the respective developing devices 100K, 100C, 100M and 100Y are consumed and life of the parts such as the developing roller 140 and the supplying roller 130 is gradually exhausted. To this end, the user needs to be aware of various information on the developing devices 100K, 100C, 100M and 100Y so as to timely replace the developing devices 100K, 100C, 100M and 100Y.

As illustrated in FIG. 1 through FIG. 4, the developing devices 100K, 100C, 100M and 100Y each include a memory unit 180 to store various usage information. For example, the memory unit 180 may store information on individual operation history of the developing devices 100K, 100C, 100M and 100Y, a residual quantity of the developer and a remaining life span of the component parts such as the developing roller 140 and the supplying roller 130.

The memory unit 180 includes terminals 181 for electric connection with a power unit provided to the main body 10, for example, the circuit board 90. The main body 10 includes terminal contact points 13 for contact with the terminals 181. The terminal contact points 13 are formed at the main body cover 11 disposed at the rear portion of the developing devices 100K, 100C, 100M and 100Y, and electrically connected with the circuit board 90 through a harness (not illustrated). The terminal contact points 13 may have a predetermined elasticity for efficient contact with the terminals 181.

Hereinafter, the memory unit 180 of the black developing device 100K will be described as an example. However, the following description can actually be applied to the memory units 180 of the other developing devices 100C, 100M and 100Y in the same manner.

Figure 5:
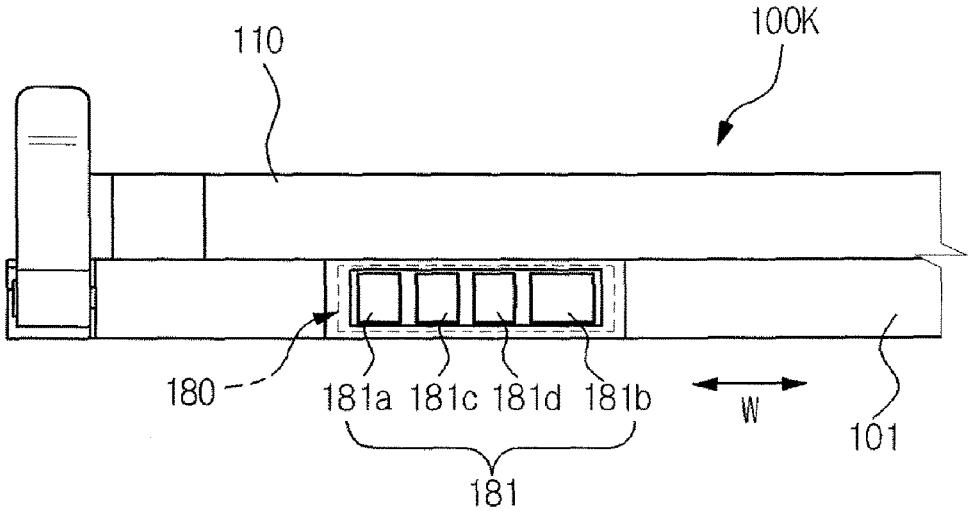
FIG. 5 is a rear view illustrating the developing device according to an embodiment of the present general inventive concept.

FIG. 5 illustrates a rear side of the developing device according to an embodiment of the present general inventive concept. As illustrated in FIG. 1 through FIG. 5, the memory unit 180 is disposed at a rear end of the developing device 100K with respect to the direction A to mount the developing device 100K to the main body 10. The terminals 181 of the memory unit 180 are exposed to the outside through a rear end 101 of the developing device 100K.

When the memory unit 180 is mounted in this way, the memory unit 180 is disposed at a distance from the fixing device 60, the photoconductive medium 40 and the developing roller 140 as illustrated in FIG. 2. As a result, damage of the memory unit 180 by high heat can be prevented and contamination of the terminals 181 by the developer scattering about can also be prevented. Furthermore, since the terminals 181 of the memory unit 180 are at the rear side of the developing device 100K, interference with other parts is reduced. Therefore, the terminals 181 will not be damaged while mounting and separating the developing device 100K with respect to the main body 10.

In addition, referring to FIGS. 4 and 5, the position of the memory unit 180 is biased to one side from a middle C of a width of the developing device 100K. More specifically, the memory unit 180 is biased to the left in FIG. 4 and FIG. 5 such that the terminals 181 are disposed relatively close to the power reception unit 170 compared with the driving force reception unit 160.

When the memory unit 180 is thus disposed relatively far from the driving force reception unit 160, the memory unit 180 would not be too affected by the vibration generated during transmission of the driving force from the main body 10 to the driving force reception unit 160. Accordingly, the connection between the terminals 181 and the terminal contact points 13 can be stably maintained.

In addition, by disposing the memory unit 180 relatively close to the power reception unit 170, the position of the terminal contact points 13 of the main body cover 11 is biased toward the circuit board 90. Therefore, a length of the harness connecting the terminal contact points 13 can be reduced. As a result, cost for the harness can be saved while reducing adverse effects of electromagnetic waves generated around the harness.

As illustrated in FIG. 5, more specifically, the terminals 181 of the memory unit 180 include first through fourth terminals 181a, 181b, 181c and 181d arranged in the width direction W of the developing device 100K.

The first terminal 181a is a data communication terminal for information exchange with a control unit (not illustrated) provided at the main body 10 of the image forming apparatus. The control unit (not illustrated) of the image forming apparatus reads necessary information from the memory unit 180 or stores new information in the memory unit 180 through the first terminal 181a.

The second terminal 181b is a grounding terminal to ground the memory unit 180. The third terminal 181c is a power terminal to apply the electric power to the memory unit 180. The fourth terminal 181d is a clock terminal to transmit clock signals to the memory unit 180.

For example, among the four terminals 181a, 181b, 181c and 181d, the first terminal 181a is disposed farthest from the driving force reception unit 160 of the developing device 100K. As illustrated in FIG. 4, when the driving force reception unit 160 is on the right of the developing device 100K, the first terminal 181a is at a leftmost position among the four terminals.

The reason of disposing the first terminal 181a as far as possible from the driving force reception unit 160 is to restrain a data transmission error caused by the vibration from the driving force reception unit 160.

Among the four terminals 181a, 181b, 181c and 181d, the second terminal 181b, for example may be at a closest position to the driving force reception unit 160. That is, when the driving force reception unit 160 is on the right of the developing device 100K as illustrated in FIG. 4, the second terminal 181b is at a rightmost position among the four terminals.

The second terminal 181b, which is the grounding terminal, contacts the terminal contact point 13 of the main body cover 11 without a function of transceiving certain information or signals. Therefore, although the second terminal 181b is most affected by the vibration since being disposed close to the driving force reception unit 160, a chance of an operational error by the poor connection would be reduced.

However, considering that the vibration affects the second terminal 181b most, the second terminal 181b may have a larger area than other terminals 181a, 181c and 181d.

As apparent from the above description, in accordance with a developing device according to various embodiments of the present general inventive concept, damage and contamination of a memory unit can be prevented by disposing the memory unit at a rear end of the developing device.

In addition, the memory unit is disposed at a position subject to less vibration transmitted from a driving force reception unit of the developing device. Also, terminals of the memory unit are disposed at proper positions in consideration of a respective function of each terminal so that an operational error caused by poor connection of the terminals can be minimized.

According to various embodiments of the present general inventive concept, since contact points of terminals connected to a memory unit are disposed near a circuit board that supplies an electric power to a developing device, a length of a harness connecting the contact points with the circuit board can be reduced. As a result, cost of parts can be saved while restraining adverse effects of electromagnetic waves generated around the harness.

Although the color image forming apparatus having a plurality of developing devices has been described so far, the present general inventive concept is not limited to the color image forming apparatus. That is, the present general inventive concept is also applicable to a black-and-white image forming apparatus having a single developing device.

Although various embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. A developing device removably mounted to an image forming apparatus, the developing device comprising:

a driving force reception unit disposed at one side of the developing device to receive a driving force from the image forming apparatus, a power reception unit disposed at an other side of the developing device to receive an electric power from the image forming apparatus; and a memory unit disposed at a rear end of the developing device with respect to an insertion direction of the developing device to the image forming apparatus and closer to the power reception unit than the driving force reception unit.

2. The developing device according to claim 1, wherein the memory unit comprises:

a plurality of terminals.

3. The developing device according to claim 2, wherein:

the plurality of terminals are exposed to the outside through a rear side of the developing device.

4. The developing device according to claim 3, wherein the driving force reception unit is disposed at one side of a front end of the developing device, and the power reception unit is disposed at the other side of the front end.

5. The developing device according to claim 2, wherein the plurality of terminals comprise:

a first terminal for data communication disposed farthest from the driving force reception unit among the plurality of terminals.

6. The developing device according to claim 2, wherein the plurality of terminals comprise:

a second terminal to provide grounding disposed closest to the driving force reception unit among the plurality of terminals.

7. The developing device according to claim 6, wherein the second terminal has a larger area than other terminals.

8. The developing device according to claim 1, wherein the memory unit is biased to one side from a middle of a width of the developing device.

9. A developing device removably mounted to an image forming apparatus, the developing device comprising:

a housing;

a driving force reception unit to receive a driving force from the image forming apparatus;

a power reception unit to receive an electric power from the image forming apparatus; and a memory unit including terminals disposed at a rear end of the housing with respect to an insertion direction of the developing device to the image forming apparatus, and disposed closer to the power reception unit than to the driving force reception unit.

10. The developing device according to claim 9, wherein the terminals comprise:

a first terminal for data communication and a second terminal to provide grounding, the first terminal disposed [relatively close to] *between* the power reception unit *and the second terminal,* and the second terminal disposed [relatively close to] *between* the driving force reception unit *and the first terminal*.

11. A developing device removably mounted to an image forming apparatus, the developing device comprising:

a driving force reception unit to receive a driving force from the image forming apparatus;

a power reception unit to receive an electric power from the image forming apparatus; and a memory unit disposed at a rear end of the developing device with respect to an insertion direction of the developing device to the image forming apparatus to store information on usage of the developing device, wherein the memory unit comprises a first terminal for data communication and a second terminal to ground, the first terminal disposed [relatively close] *closer* to the power reception unit *than the second terminal,* and the second terminal disposed [relatively close] *closer* to the driving force reception unit *than the first terminal.*

12. A memory unit mounted to a developing device which operates by receiving a driving force and an electric power from an image forming apparatus, the memory unit comprising:

a plurality of terminals exposed through a rear side of the developing device with respect to an insertion direction of the developing device to the image forming apparatus and disposed closer to a second position of the developing device, *the second position configured* to receive the electric power from the image forming apparatus, than to a first position of the developing device, *the first position configured* to receive the driving force from the image forming apparatus.

13. A memory unit mounted to a developing device including a driving force reception unit to receive a driving force from an image forming apparatus and a power reception unit to receive an electric power from the image forming apparatus so as to store information on usage of the developing device, the memory unit comprising:

a first terminal for data communication and a second terminal to provide grounding, the first terminal disposed [relatively close] *closer* to the power reception unit *than the second terminal,* and the second terminal disposed [relatively close] *closer* to the driving force reception unit *than the first terminal*, wherein the memory unit is disposed at a rear end of the developing device with respect to an insertion direction of the developing device to the image forming apparatus.

14. An image forming apparatus, comprising:

a main body including terminal contact points; and a developing device removably mounted to the main body, wherein the developing device includes a driving force reception unit to receive a driving force from the main body, a power reception unit to receive an electric power from the main body, and a memory unit including terminals electrically connected with the terminal contact points, the terminals are disposed at a rear end of the developing device with respect to an insertion direction of the developing device to the main body and disposed closer to the power reception unit than to the driving force reception unit.

15. The image forming apparatus according to claim 14, wherein the main body comprises:

a main body cover disposed at a rear portion of the developing device with respect to the mounting direction of the developing device, and the terminal contact points are disposed at the main body cover corresponding to the terminals.

16. The image forming apparatus according to claim 14, wherein the terminals comprise:

a first terminal for data communication and a second terminal to provide grounding, and the first terminal is disposed closer to the power reception unit than the second terminal.

17. The image forming apparatus according to claim 16, wherein the second terminal among the terminals is closest to the driving force reception unit.

18. The image forming apparatus according to claim 14, further comprising:

a circuit board mounted to the main body proximate to the power reception unit.

19. An image forming apparatus, comprising:

a main body;

a main body cover pivotably mounted to the main body to open and close the main body; and a developing device to be inserted and separated with respect to the main body with the main body cover opened, the developing device including a housing, a driving force reception unit disposed at one side of the housing to receive a driving force from the main body, a power reception unit disposed at the other side of the housing to receive an electric power from the main body, and a memory unit, disposed at a rear end of the developing device with respect to an insertion direction of the developing device to the main body and closer to the power reception unit than to the driving force reception unit, wherein the main body cover includes terminal contact points elastically connected with the memory unit and a pressing member elastically pressing the developing device.

20. An image forming apparatus, comprising:

a main body having an opening;

a main body cover to open and close the opening of the main body and having a terminal contact;

a developing device to be inserted to and separated from the main body through the opening, and having a memory unit disposed at a rear end of the developing device with respect to an insertion direction of the developing device to the main body and having a terminal to contact the terminal contact of the main body cover when the main body cover closes the opening of the main body.

*21. The developing device according to claim 1, wherein the driving force reception unit is disposed at one side of a front end of the developing device,*

*the power reception unit is disposed at an other side of the front end of the developing device, and*

*the memory unit comprises a plurality of terminals,*

*wherein the plurality of terminals are externally exposed through, and disposed at, the rear end of the developing device with respect to a direction of mounting the developing device into the image forming apparatus and are connectable through contacting with terminal contact points formed at a main body cover of the image forming apparatus,*

*wherein a developing roller is disposed at the front end of the developing device and is adapted to supply developer to the photoconductive medium provided in the image forming apparatus,*

*wherein a first terminal for data communication is disposed farther from the driving force reception unit than at least one of the other terminals, and*

*a second terminal operable to provide grounding of the memory unit without a function of transceiving certain information or signals is disposed closer to the driving force reception unit than the first terminal.*

*22. The developing device according to claim 21, wherein the plurality of terminals of the memory unit are positioned to one side of a middle of a width of a surface perpendicular to the direction of mounting of the developing device.*

*23. The developing device according to claim 21, wherein the plurality of terminals comprise:*

*a third terminal to provide power to the memory unit and a fourth terminal to provide clock signals to the memory unit disposed between the first terminal and the second terminal sequentially.*

*24. The developing device according to claim 21, wherein the plurality of terminals comprise:*

*a third terminal to provide clock signals to the memory unit disposed between the first terminal and the second terminal.*

*25. The developing device according to claim 21, wherein the developing device is adapted to receive pressing members formed on an inner surface of a main body cover of the image forming apparatus to prevent movement of the developing device.*

*26. The developing device according to claim 21, wherein the developing device further comprises handles mounted to both sides of the rear end of the developing device for mounting or separating the developing device.*

*27. The developing device according to claim 22, wherein the terminals comprise:*

*a first terminal for data communication and a second terminal to provide clock signals to the memory unit, the first terminal disposed between the power reception unit and the second terminal, and the second terminal disposed between the driving force reception unit and the first terminal.*

*28. The developing device according to claim 23, wherein the second terminal has a larger area than other terminals.*

*29. The image forming apparatus according to claim 20, wherein*

*the developing device further comprises a driving force reception unit disposed at one side of the developing device to receive a driving force from the image forming apparatus, and a power reception unit disposed at an other side of the developing device to receive an electric power from the image forming apparatus, and*

*wherein the terminal comprises a plurality of terminals which are externally exposed through the rear end of the developing device with respect to a direction of mounting the developing device to the image forming apparatus, wherein the plurality of terminals are disposed closer to the power reception unit than the driving force reception unit; and wherein a developing roller is disposed at a front end of the developing device and is adapted to supply developer to a photoconductive medium provided in the image forming apparatus,*

*wherein the apparatus is further adapted such that the memory unit is accessed by the main body of the image forming apparatus when the main body cover is closed, and an electrical connection between the memory unit and the main body is established when the cover is closed.*

*30. The image forming apparatus according to claim 20, wherein*

*the main body cover is pivotably mounted to the main body,*

*the developing device is removably mounted to the main body to supply developer to a photoconductive medium of a photoconductive medium housing mounted to the main body, and*

*the memory unit is removably mounted to the developing device,*

*wherein the developing device further comprises:*

*a driving force reception unit disposed at one side of a front end of the developing device to receive a driving force from the image forming apparatus; and*

*a power reception unit disposed at an other side of the front end of the developing device to receive an electric power from the image forming apparatus.*

*31. The image forming apparatus of claim 29, wherein the developing device comprises four developing devices.*

*32. The image forming apparatus according to claim 29, wherein the insertion direction is substantially parallel to a longest dimension of the developing device in a direction perpendicular to an axis of rotation of the developing roller of the image forming apparatus.*

*33. The image forming apparatus of claim 30, wherein the terminal comprises a plurality of terminals,*

*wherein the plurality of terminals are externally exposed through and connectable through contacting with the terminal contact point of the image forming apparatus;*

*wherein the plurality of terminals are disposed closer to the power reception unit than the driving force reception unit; and*

*wherein a first terminal for data communication is disposed farther from the driving force reception unit than at least one of the other terminals, and*

*a second terminal operable to provide grounding of the memory unit without a function of transceiving certain information or signals is disposed closer to the driving force reception unit than the first terminal.*

*34. The image forming apparatus according to claim 30, wherein the insertion direction is substantially parallel to a longest dimension of the developing device in a direction perpendicular to an axis of rotation of the developing roller of the image forming apparatus.*

* * * * *